United States Patent
Zhang et al.

(10) Patent No.: US 9,503,367 B2
(45) Date of Patent: Nov. 22, 2016

(54) RISK MITIGATION IN DATA CENTER NETWORKS USING VIRTUAL MACHINE SHARING

(71) Applicant: Fujitsu Limited, Kanagawa (JP)

(72) Inventors: Qiong Zhang, Plano, TX (US); Xi Wang, Murphy, TX (US); Paparao Palacharla, Richardson, TX (US); Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 14/470,265

(22) Filed: Aug. 27, 2014

(65) Prior Publication Data

US 2016/0065461 A1   Mar. 3, 2016

(51) Int. Cl.
| | |
|---|---|
| H04L 12/715 | (2013.01) |
| H04L 12/24 | (2006.01) |
| G06F 9/50 | (2006.01) |
| H04L 12/741 | (2013.01) |

(52) U.S. Cl.
CPC ............ H04L 45/64 (2013.01); G06F 9/5027 (2013.01); H04L 41/042 (2013.01); H04L 41/142 (2013.01); H04L 45/745 (2013.01)

(58) Field of Classification Search
CPC ............... G06F 9/45533; G06F 2009/4557; G06F 9/455; G06F 9/5088; H04L 43/16; H04L 47/70; H04L 47/822; H04L 45/64; H04L 67/1074; H04L 67/1076; Y02B 60/142; Y02B 60/146; Y02B 60/148; Y02B 60/167
See application file for complete search history.

(56) References Cited

U.S. PATENT DOCUMENTS

| | | | |
|---|---|---|---|
| 7,149,797 B1 | 12/2006 | Weller et al. | 709/223 |
| 7,653,689 B1 | 1/2010 | Champagne et al. | 709/206 |
| 8,108,502 B2 | 1/2012 | Tabbara et al. | 709/223 |
| 8,160,063 B2 | 4/2012 | Maltz et al. | 370/389 |
| 8,229,785 B2 | 7/2012 | Fung et al. | 705/7.12 |
| 8,422,399 B2 | 4/2013 | Gorman | 370/254 |
| 8,665,886 B2 | 3/2014 | Gupta et al. | 370/401 |
| 8,830,835 B2 * | 9/2014 | Casado | H04L 12/66 370/235 |
| 8,837,491 B2 | 9/2014 | Huynh Van et al. | 370/395.31 |
| 8,983,675 B2 | 3/2015 | Dawson et al. | 700/300 |

(Continued)

OTHER PUBLICATIONS

C. Develder et al., "Survivable optical grid dimensioning: anycast routing with server and network failure protection", Proc. ICC 2011, 5 pages, 2011.

(Continued)

*Primary Examiner* — Sargon Nano
(74) *Attorney, Agent, or Firm* — Baker Botts L.L.P.

(57) ABSTRACT

A method employing resource orchestration algorithms may find a fewest number of working data centers (DCs) to guarantee K-connect survivability and a fewest number of virtual machines (VMs) among the DCs using an overlay network representing a physical optical network. The overlay network may exclude certain topological features of the physical optical network. An intra-request VM sharing method may share VMs among DCs allocated for an aggregation request. An intra-request VM sharing method may share VMs among DCs represented in the overlay network and among multiple aggregation requests.

18 Claims, 6 Drawing Sheets

(56) References Cited

U.S. PATENT DOCUMENTS

| | | | |
|---|---|---|---|
| 9,374,294 B1* | 6/2016 | Pani | H04L 12/18 |
| 2007/0153782 A1 | 7/2007 | Fletcher et al. | 370/389 |
| 2007/0288247 A1 | 12/2007 | Mackay | 705/1 |
| 2008/0155061 A1 | 6/2008 | Afergan et al. | 709/218 |
| 2010/0229185 A1* | 9/2010 | Howarth | H04L 12/2602 |
| | | | 719/318 |
| 2010/0332373 A1 | 12/2010 | Crabtree et al. | 705/37 |
| 2013/0044641 A1* | 2/2013 | Koponen | H04L 12/66 |
| | | | 370/255 |
| 2013/0044751 A1* | 2/2013 | Casado | H04L 12/66 |
| | | | 370/392 |
| 2013/0044752 A1* | 2/2013 | Koponen | H04L 12/66 |
| | | | 370/392 |
| 2013/0044761 A1* | 2/2013 | Koponen | H04L 12/66 |
| | | | 370/401 |
| 2013/0044762 A1* | 2/2013 | Casado | H04L 12/66 |
| | | | 370/401 |
| 2013/0044763 A1* | 2/2013 | Koponen | H04L 12/66 |
| | | | 370/401 |
| 2013/0044764 A1* | 2/2013 | Casado | H04L 12/66 |
| | | | 370/401 |
| 2013/0142203 A1* | 6/2013 | Koponen | H04L 12/66 |
| | | | 370/401 |
| 2013/0242999 A1* | 9/2013 | Kamble | G06F 9/45558 |
| | | | 370/392 |
| 2013/0318521 A1* | 11/2013 | Monaghan | H04L 63/107 |
| | | | 718/1 |
| 2014/0149493 A1* | 5/2014 | Acer | H04W 4/003 |
| | | | 709/203 |
| 2014/0317257 A1 | 10/2014 | Zhang et al. | 709/223 |
| 2015/0088586 A1* | 3/2015 | Pavlas | G06F 9/45558 |
| | | | 705/7.25 |
| 2015/0124823 A1* | 5/2015 | Pani | H04L 12/18 |
| | | | 370/392 |
| 2015/0195178 A1* | 7/2015 | Bhattacharya | H04L 43/106 |
| | | | 718/1 |
| 2015/0236952 A1* | 8/2015 | Liang | H04L 61/2596 |
| | | | 370/230 |
| 2015/0339136 A1* | 11/2015 | Suryanarayanan | G06F 9/455 |
| | | | 718/1 |
| 2015/0373102 A1* | 12/2015 | Antony | H04L 67/1095 |
| | | | 709/219 |
| 2016/0050115 A1* | 2/2016 | Ganesan | H04L 67/1097 |
| | | | 709/221 |
| 2016/0202744 A1* | 7/2016 | Castro-Leon | H04L 67/1097 |
| | | | 713/310 |

OTHER PUBLICATIONS

J. He, "Software-defined Transport Network for Cloud Computing", OFC 2013, 3 pages, 2013.

D. Simeonidou et al., "Software Defined Optical Networks Technology and Infrastructure: enabling Software-Defined Optical Network Operations", OFC 2013, 3 pages, 2013.

E. Vollset et al., "Scribble: an Efficient Reliable Manycast protocol for Ad-hoc Networks", Proc. IEEE Conference on Mobile Ad-hod and Sensor Systems, 3 pages, 2004.

G. Wang et al., "Programming Your Network at Run-time for Big Data Applications", Proc. HotSDN 2012, 6 pages, 2012.

J. Weinman, "Axiomatic Cloud Theory", [Online], 29 pages, http://www.joeweinman.com/Resources/Joe_Weinman_Axiomatic_Cloud_Theory.pdf, Jul. 29, 2011.

Y. Zhu et al., "Algorithms for Assigning Substrate Network Resources to Virtual Network Components", Proc. INFOCOMM 2006, 12 pages, 2006.

Q. Zhang et al., "Survivable resource orchestration for optically interconnected data center networks", Optics Express, 22(1):23-29, Dec. 20, 2013.

J. Xiao et al., "Data Center Network Placement and Service Protection in All-Optical Mesh Networks", 2013 9th International Conference on the IEEE, pp. 88-94, Mar. 4, 2013.

T. Li and B. Wang, "Approximating Optimal Survivable Scheduled Service Provisioning in WDM Optical Networks with Shared Risk Link Groups", 4th International Conference on IEEE, 10 pages, Sep. 10, 2007.

C. Develder et al., "Resilient network dimensioning for optical grid/clouds using relocation", New Trends in Optical Networks Survivability, pp. 6262-6267, Jun. 10, 2012.

Extended European Search Report issued in EP Patent Appl. No. 14156612.5-1853; 8 pages, Feb. 17, 2015.

Office Action, U.S. Appl. No. 14/102,313; 7 pages, Jul. 13, 2015.

Office Action, U.S. Appl. No. 14/102,313; 6 pages, Nov. 25, 2015.

* cited by examiner

300 — OVERLAY NETWORK FOR VM SHARING EXAMPLE

FIG. 3A

REQUEST R1 for $DC_4$, K=2, V=30, M=3   301-1

FIG. 3B 301-2   REQUEST R2 for $DC_5$, K=1, V=10, M=2

RISK MITIGATION IN DATA CENTER NETWORKS USING VIRTUAL MACHINE SHARING

CROSS-REFERENCE TO RELATED APPLICATION

This application is related to U.S. application Ser. No. 14/102,313 filed Dec. 10, 2013, which is hereby incorporated by reference.

BACKGROUND

1. Field of the Disclosure

The present disclosure relates generally to data center networks and, more particularly, to risk mitigation in data center networks using virtual machine sharing.

2. Description of the Related Art

As more applications and workloads are moving to online network computing resources, also generally referred to as 'the cloud', geographically distributed data centers (DCs) are being deployed across wide-area networks, including optical networks. Such data centers may provide various instances of virtual machines (VMs) that may individually instantiate a computing environment, such as a server operating system, for example. Cloud applications may rely on distributed DCs for improved user experience. However, some cloud service providers may not own optical network infrastructure and may count on network providers to optically interconnect distributed DCs. Some network providers may be unwilling and/or unable to expose their full network topology information to cloud service providers.

Many cloud applications in distributed DCs are arranged in an aggregation communication pattern, whereby an aggregation DC collects data processed at distributed DCs and outputs final results to users. Cloud applications can make physically dispersed VMs operate logically as one DC by collecting results from dispersed VMs at an aggregation DC. Other applications, such as cloud search and data backup, for example, can allocate VMs close to data stored in distributed DCs and provide results at an aggregation DC for access by users. In certain instances, complicated communication patterns can be constituted by scheduling a sequence of data aggregations.

Due to the reliance on distributed DCs and aggregation DCs, survivability in the face of various risks, such as network outages, DC failure(s), and/or equipment failure, among other examples, is becoming an important issue for cloud applications. Accordingly, there is a need in the art for an overlay framework that enables cloud service providers to control cloud network connections and optimize resource orchestration, yet enables network operators to offer network services while retaining detailed network topology information.

SUMMARY

In one aspect, a disclosed method includes identifying a smallest M number of data centers (DCs) in an overlay network for K-connect survivability associated with an aggregation request for an aggregation DC and a smallest V number of virtual machines (VMs) among the M DCs. When K-connect survivability is satisfied for the M number of DCs, the method may include determining a number of VMs at each of the M DCs, including determining a number of working VMs and a number of protecting VMs, respectively. The method may also include generating a VM-share table according to the aggregation request. A minimum number of shared protecting VMs may be calculated for a set of risks associated with each of the M DCs. The method may further include updating the number of working VMs and the number of protecting VMs based on the minimum number of shared protecting VMs for each of the M DCs. The value K may represent a minimum number of DCs that remain accessible to the aggregation DC. The overlay network may represent a physical network.

In particular embodiments, the method operation of determining that K-connect survivability is satisfied may include determining the number of VMs at each of the M DCs for the aggregation request, calculating a current value of an integrated factor I for each of m DCs that are unselected, sorting the m DCs according to I, and adding a DC from the m DCs having a lowest value for I to the M DCs.

Additional disclosed aspects for identifying a smallest M number of data centers (DCs) for K-connect survivability include an article of manufacture comprising a non-transitory, computer-readable medium, and computer executable instructions stored on the computer-readable medium. A further aspect includes a management system comprising a memory, a processor coupled to the memory, and computer executable instructions stored on the memory.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

In U.S. application Ser. No. 14/102,313, a K-connect survivability concept is disclosed that may guarantee resource availability under a wide range of risks for cloud applications. Two resource orchestration schemes are disclosed that may implement the K-connect survivability concept in an overlay framework for optical network virtualization: a risk-based scheme and a delay-based scheme. The resource orchestration schemes may identify a fewest number of data centers for guaranteeing K-connect survivability, where K represents a minimum number of DCs that remain accessible from an aggregation DC.

As described in further detail herein, the previous K-connect survivability concept is expanded to focus on VM allocation in the overlay framework with the objective of minimizing a total number of VMs allocated to the overlay network. Thus, in addition to K-connect survivability, a given number of VMs connecting to an aggregation DC for any failure at any time is also satisfied by the methods described herein using VM sharing among DCs in the overlay framework. The following parameters in Table 1, which are integers greater than zero, are used herein with respect to K-connect survivability using VM sharing.

TABLE 1

Parameters used for K-connect survivability using VM sharing.

| Parameter | Description |
|---|---|
| K | A minimum number of DCs that remain accessible to an aggregation DC |
| L | A number of shared risk groups (SRGs) in an overlay network |
| M | A minimum number of working DCs for satisfying K-connect survivability |
| N | A number of shared risk groups (SRG) |
| V | A total number of VMs connecting to a DC for any failure at any time |

A K-connect survivability (KCS) may be defined by a scenario where at least K number of DCs (out of M original working DCs) are reachable from an aggregation DC ($DC_a$) for an arbitrary risk, such as, but not limited to, network outages, DC failure(s), and/or other types of equipment failure (also referred to herein collectively as "risk events"). For the purposes of the present disclosure, it may be assumed that $DC_a$ does not fail. A risk event may result in multiple failures that may occur at DC sites (e.g., due to power outages, natural disasters, and/or system maintenance) or in networks (due to fiber cuts). For cloud applications requesting a fixed number of VMs V, K-connect survivability using VM sharing may satisfy an aggregation request specifying V while minimizing a total number of VMs allocated to DCs in the overlay framework. It is noted that the number of VMs allocated to the overlay framework may be determinative for a bandwidth of network connections with the overlay framework, since each VM may be associated with a certain amount of bandwidth consumption.

As will be described herein, an overlay framework is presented that interconnects distributed data centers by virtualized optical networks. Survivable resource orchestration algorithms, based on the network information provided by the virtualized optical networks, such as shared risk groups (SRG) and delay, are disclosed. The disclosed resource orchestration algorithms may find a fewest number of working DCs to ensure K-connect survivability and a fewest overall number of VMs to satisfy the requested value for V. Resource orchestration algorithms disclosed in U.S. application Ser. No. 14/102,313 may provision the fewest number of working DCs based on SRG information provided for overlay networks, where physical network topology may be unavailable and routing for connections may not be possible. In addition to satisfying K-connect survivability, the fewest number of VMs may be allocated within the overlay network to satisfy the requested value for V.

Figure 1:
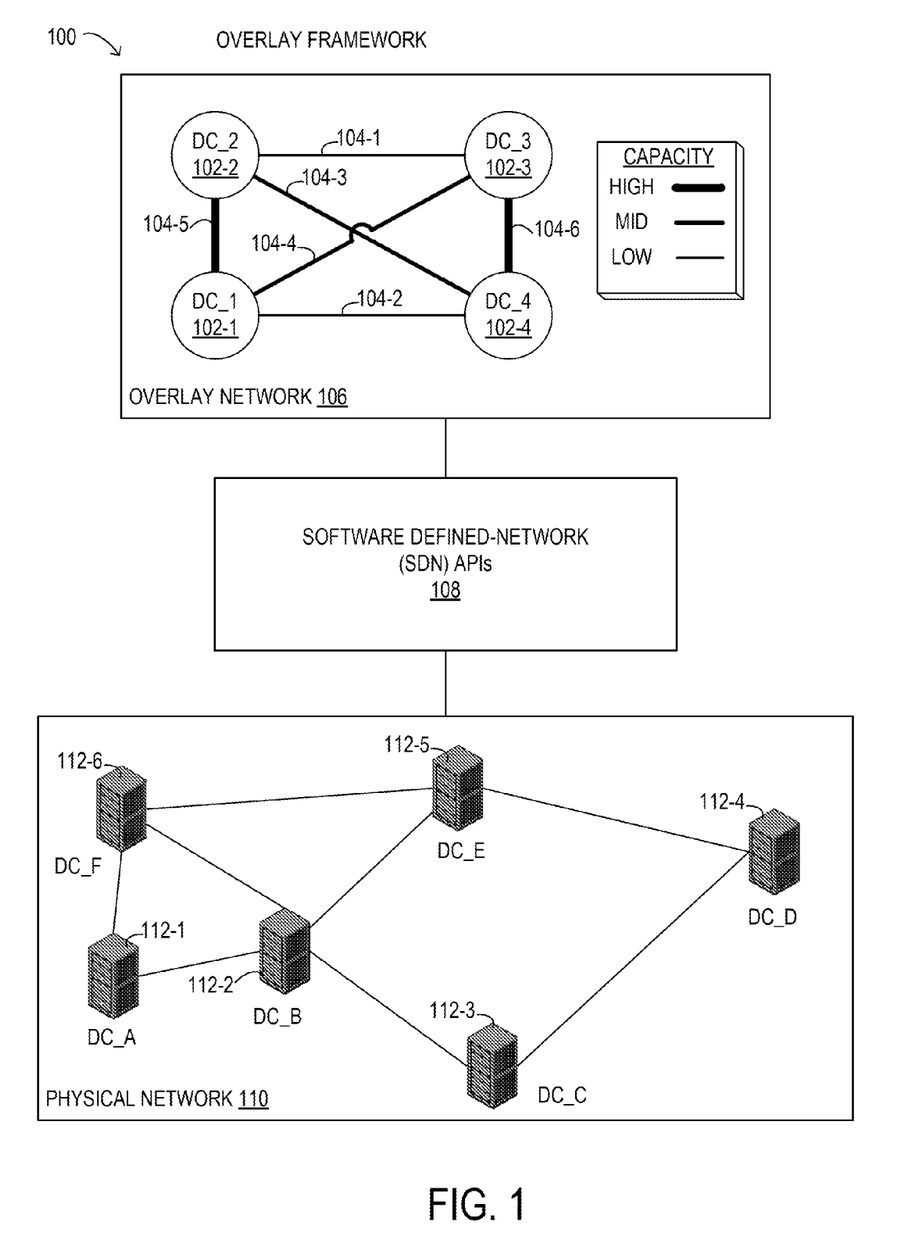
FIG. 1 is a block diagram of selected elements of an embodiment of an overlay framework.

Turning now to the drawings, FIG. 1 illustrates an example embodiment of overlay framework 100, which may be based on optical network virtualization. In FIG. 1, overlay framework 100 is shown including overlay network 106, software defined-network (SDN) application programming interfaces (APIs) 108, and physical network 110. As shown, overlay network 106 may comprise connections 104 between DCs 102, where a bandwidth of connections 104 may be adjustable using optical network virtualization. In FIG. 1, an underlying optical network, represented by physical network 110, may be an optical transport network (OTN) and/or a flexible optical data plane (e.g., flexible transceivers) configured to adjust the bandwidth of connections.

In FIG. 1, overlay network 106 is shown comprising virtualized DCs 102 and connections 104. In certain embodiments, DCs 102 may correspond to physical DCs 112; for example, DC_1 102-1 may represent DC_A 112-1, DC_2 102-2 may represent DC_F 112-6, DC_3 102-3 may represent DC_E 112-5, and DC_4 102-4 may represent DC_C 112-3, while DC_B 112-2 and DC_D 112-4 may not be explicitly included in overlay network 106. In other embodiments, DCs 102 may include computing resources from one or more physical DCs 112, and may represent virtualized DCs; for example, DC_1 102-1 may represent at least portions of DC_A 112-1 and DC_B 112-2, etc. It will be understood that other arrangements and configurations of mapping DCs 112 in physical network 110 to DCs 102 in overlay network 106 may be practiced in different embodiments. Furthermore, connections 104 may represent virtualized connections having a given capacity for transporting data. As shown, connections 104-1 and 104-2 may represent low capacity connections, connections 104-3 and 104-4 may represent mid capacity connections, while connections 104-5 and 104-6 may represent high capacity connections. Although connections 104 are shown in overlay network connecting two DCs 102, connections 104 may be physically implemented using various network topologies, and may actually represent physical connections that include different nodes and/or network segments. However, to a cloud service provider using overlay network 106 as an operational network platform, the actual physical topology may remain hidden and/or may change over time.

Cloud service providers may have a centralized controller (not shown in the drawings) that manages VMs at DCs interconnected by overlay network 106. The centralized controller (also referred to herein simply as "the controller") may obtain network information, such as delay and SRG of connections, and may request the bandwidth of connections through network application programming interfaces (APIs) with the help of network control and management tools, such as software-defined networks (SDN). As shown in overlay framework 100, SDN APIs 108 may represent software tools for enabling a user (e.g., a cloud provider) of overlay network 106 to query network information. It is noted that overlay framework 100 may enable network providers of physical network 110 to keep detailed physical network topology information hidden, while allowing cloud service providers to easily set up cloud services, to perform resource orchestration, and to flexibly increase or reduce the bandwidth of connections. The cloud providers may use SDN APIs 108 to query certain specific attributes for DCs 102 and/or connections 104 in overlay network 106, without having knowledge of the specific network topology of physical network 110, and/or without direct interaction with hidden components in physical network 110, such as intermediate network devices along connection paths 104 that are not included in overlay network 106.

Figure 2A:
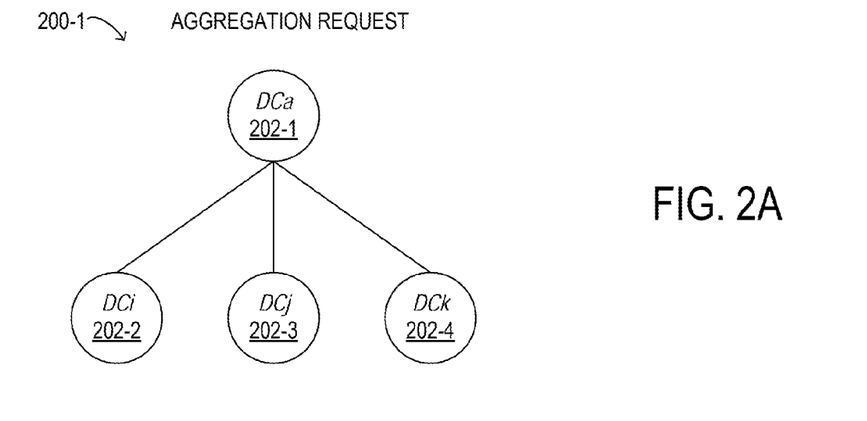
FIG. 2A is a block diagram of selected elements of an embodiment of an aggregation request.
Figure 2B:
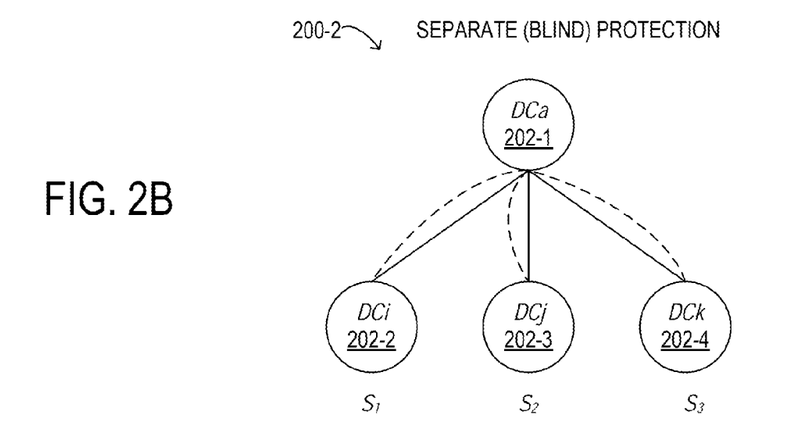
FIG. 2B is a block diagram of selected elements of an embodiment of separate protection of an aggregation data center.
Figure 2C:
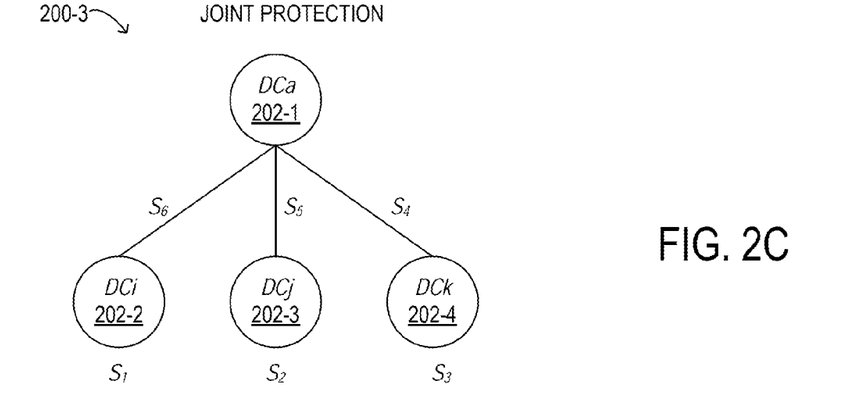
FIG. 2C is a block diagram of selected elements of an embodiment of joint protection of an aggregation data center.

Referring now to FIGS. 2A, 2B, and 2C, example embodiments of aggregation requests 200 and corresponding protection schemes are illustrated in diagram form. The controller may receive cloud aggregation requests and may perform resource orchestration. In one example embodiment. As shown in FIG. 2A, aggregation request 200-1 may illustrate how aggregation $DC_a$ 202-1 handles a basic aggregation request, for example, via the controller, by aggregating data from $DC_i$ 202-2, $DC_j$ 202-3, and $DC_k$ 202-4. More complicated aggregation requests may be generated using a combination of basic aggregation requests and/or sets of basic aggregation requests.

Guaranteeing K-connect survivability may save network cost by jointly considering information from physical networks and DCs. In FIG. 2B separate (blind) protection 200-2 shows an example where $s_i$ indicates risk i and network connections may be blindly protected by providing path-disjoint connections (dotted lines) from aggregation $DC_a$ 202-1. In FIG. 2B, K-connect survivability for K=2 (i.e., 2-connect survivability) may be guaranteed by protecting against risk events at DCs separately from the network connections, which may result in 6 connections in separate protection 200-2. In FIG. 2C, joint protection 200-3 illustrates, by using shared risk group (SRG) information from underlying optical networks, how 2-connect survivability may be guaranteed by finding network connections and DCs that can be jointly protected. For example, risks $S_1$ and $S_6$ may be joined in one SRG, risk $S_2$ and $S_5$ may be joined in a second SRG, and risks $S_3$ and $S_4$ may be joined in a third SRG. In joint protection 200-3, significant savings in network resources may be achieved by having 3 connections, representing a savings of 3 protection connections as compared to FIG. 2B.

Using SDN APIs 108 (see FIG. 1), a subset of DCs with minimum delay may be identifiable when multiple subsets of DCs that satisfy K-connect survivability exist. A delay of an aggregation request may be given by a total delay of connections between the subset of DCs and the aggregation DC ($DC_a$). It is noted that $DC_a$ may be allocated to a DC that is relatively near to users or relatively near to a particular subset of DCs, depending on specific applications.

Figure 3A:
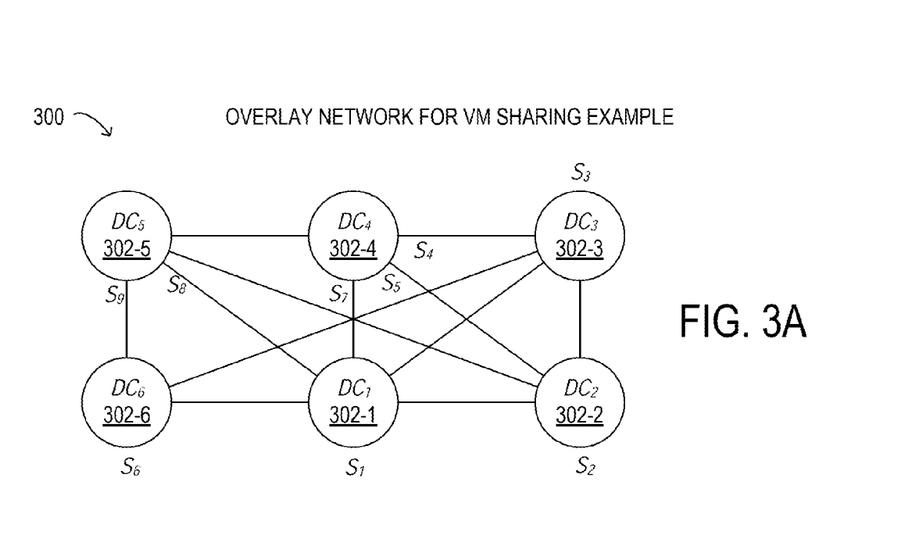
FIG. 3A is a block diagram of selected elements of an embodiment of an overlay network.

Referring now to FIG. 3A, an example embodiment of overlay network 300 for K-connect survivability using VM sharing is illustrated in diagram form. Overlay network 300 may include 6 DCs, given by $DC_1$ 302-1, $DC_2$ 302-2, $DC_3$ 302-3, $DC_4$ 302-4, $DC_5$ 302-5, and $DC_6$ 302-6. Overlay network 300 is shown to provide an overlay framework for aggregation requests 301 described below with respect to FIGS. 3B and 3C.

Figure 3B:
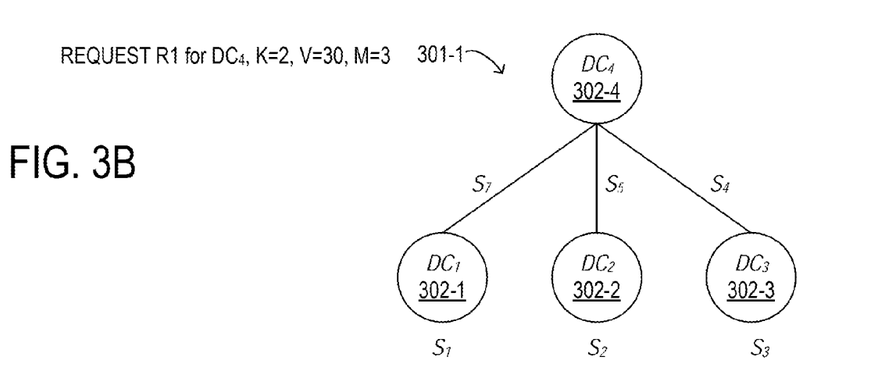
FIG. 3B is a block diagram of selected elements of an embodiment of an aggregation request.
Figure 3C:
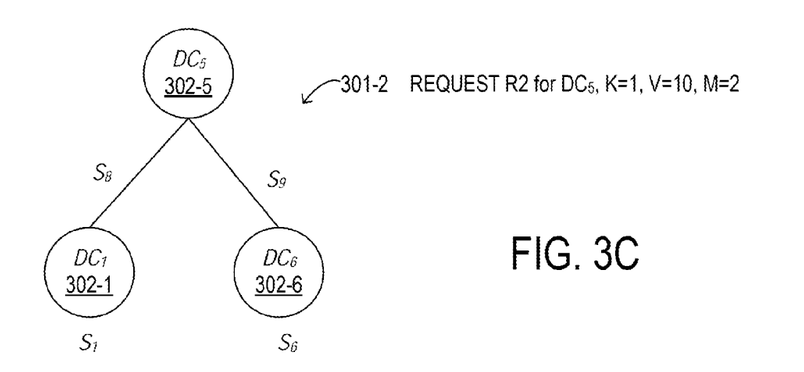
FIG. 3C is a block diagram of selected elements of an embodiment of an aggregation request.

Referring now to FIGS. 3B, and 3C, example embodiments of aggregation requests 301 and corresponding joint protection schemes are illustrated in diagram form. As shown in FIG. 3B, aggregation request 301-1 illustrates an aggregation request for $DC_a=DC_4$ 302-4, while aggregation request 301-2 in FIG. 3C illustrates an aggregation request for $DC_a=DC_5$ 302-5. In aggregation request 301-1, $DC_1$ 302-1 is associated with shared risks $S_7$ and $S_1$, $DC_2$ 302-2 is associated with shared risks $S_5$ and $S_2$, and $DC_3$ 302-3 is associated with shared risks $S_4$ and $S_3$. In aggregation request 301-2, $DC_1$ 302-1 is associated with shared risks $S_8$ and $S_1$, and $DC_6$ 302-6 is associated with shared risks $S_9$ and $S_6$. Certain parameters associated with aggregation requests 301 are listed in Table 2.

TABLE 2

Parameters for K-connect survivability with VM sharing example algorithms.

| Request | $DC_a$ | K | V | M |
| --- | --- | --- | --- | --- |
| R1 (301-1) | $DC_4$ | 2 | 30 | 3 |
| R2 (301-2) | $DC_5$ | 1 | 10 | 2 |

An aggregation request may satisfy K-connect survivability and may also specify a given number of VMs (V) for risk events. When a risk event occurs, an aggregation request with K-connect survivability may allocate additional VMs at the surviving K DCs out of M number of working DCs in order to maintain V number of VMs. For determining K-connect survivability without considering VM sharing, it may be assumed that each DC is allocated the same number of VMs for a given aggregation request. Thus, the total VMs for an aggregation request with K-connect survivability may be given by V*M/K. However, when VMs are shared among DCs associated with the aggregation request, referred to as intra-request VM sharing, the number of allocated VMs may vary among the DCs. Furthermore, when VMs are shared between different aggregation requests among DCs in the overlay network, referred to as inter-request VM sharing, the number of allocated VMs may also vary among DCs.

Based on FIGS. 3A, 3B, and 3C, the following problem description may be applied to the methods for K-connect survivability using VM sharing.

GIVEN: An overlay network has N number of DC sites and a set of L shared risk groups (SRGs) for risks $S=\{s_1, s_2, \ldots, s_l, \ldots, s_L\}$. In the overlay network, each connection $E_{ij}$ between $DC_i$ and $DC_j$ has network information including delay, $d_{ij}$, and a vector of associated SRGs, $A_{ij}=\{\alpha_{ij1}, \alpha_{ij2}, \ldots, \alpha_{ijl}, \ldots, \alpha_{ijL}\}$, where $\alpha_{ij1}=1$ indicates that $s_1$ is associated with $E_{ij}$; otherwise $\alpha_{ij1}=0$. Similarly, each $DC_i$ is associated with a set of SRGs, $A_i$. Also, an aggregation request is received that requires K DCs to be connected to an aggregation $DC_a$ and requires that a total number of V VMs remain connected to $DC_a$, even during a risk event.

FIND: At least M number of working DCs for each aggregation request such that:
1) The total number of VMs required at an overlay network for all aggregation requests are minimized;
2) K number of DCs remain connected to $DC_a$ even during a risk event, which guarantees K-connect survivability (KCS); and
3) V number of VMs remain connected to $DC_a$ even during a risk event.

As will now be described in further detail, algorithms are disclosed for solving the KCS problem in optically interconnected distributed DC networks using intra-request VM sharing and inter-request VM sharing.

Algorithm VM1—Intra-Request VM Sharing:

In algorithm VM1, a variable X is defined as K≤X≤M, where X represents a number of DCs for allocating V working VMs. Then, KCS may be solved to select X DCs using the delay-based or risk-based methods disclosed in U.S. application Ser. No. 14/102,313. Then, among the X DCs, a number of working VMs given by V/X are allocated to each of the X DCs. It is noted that instead of V/X another arbitrary number of working VMs may be allocated among the X DCs, for example, depending on the particular cloud applications being supported. The remaining VMs associated with the aggregation request, given by (V*M/K)−V, may represent protecting VMs.

An example embodiment of results of algorithm VM1 corresponding to Request R1 301-1 in FIG. 3B, where each of $DC_1$ 302-1, $DC_2$ 302-2, $DC_3$ 302-3 may execute 15 VMs, is shown in Table 3.

TABLE 3

Allocated VMs in algorithm VM1.

| X | $DC_1$ 302-1 | $DC_2$ 302-2 | $DC_3$ 302-3 |
|---|---|---|---|
| 2 (=K) | 15 working VMs<br>0 protecting VMs | 15 working VMs<br>0 protecting VMs | 0 working VMs<br>15 protecting VMs |
| 3 (=M) | 10 working VMs<br>5 protecting VMs | 10 working VMs<br>5 protecting VMs | 10 working VMs<br>5 protecting VMs |

Algorithm VM2—Inter-Request VM Risk-Based Sharing:

In algorithm VM2, a VM-share table is generated for each aggregation request r in the set of aggregation requests R. The VM-share table includes value pairs $(s_i, v_{ijr})$, where $V_{ijr}$ is a number of protecting VMs required at $DC_j$ when a risk $s_i$ in the set of risks S occurs for aggregation request r. A minimum number of shared protecting VMs at $DC_j$ is calculated as $$\mathrm{Max}_{\forall s_i \in S}\left(\sum_{\forall r \in R} v_{ijr}\right).$$

For aggregation requests R1 301-1 and R2 301-2, assuming that $DC_1$ 302-1 and $DC_6$ 302-6 may allocate 10 VMs each for aggregation request R2 301-2, the following VM-share tables given in Tables 4 and 5 are obtained for $DC_1$ 302-1 (representing a surviving DC in the event of the risk).

TABLE 4

VM-share table for $DC_1$ 302-1 for aggregation request R1 301-1 where X = K.

| Risk | $V_{ijr}$ |
|---|---|
| $s_2$ | 15 |
| $s_3$ | 15 |
| $s_4$ | 15 |
| $s_5$ | 15 |

TABLE 5

VM-share table for $DC_1$ 302-1 for aggregation request R2 301-2 where X = M.

| Risk | $V_{ijr}$ |
|---|---|
| $s_6$ | 5 |
| $s_9$ | 5 |

Because the total number of working and protecting VMs is given by V*M/K, a lower value for M will result in a lower number of VMs. The risk-based KCS scheme disclosed in U.S. application Ser. No. 14/102,313 may then be applied to determine the least M number of DCs to satisfy KCS. When KCS is not satisfied according to the risk-based scheme, then algorithm VM2 may end without a result. When KCS is satisfied according to the risk-based scheme, then algorithm VM2 may subsequently include the operations in Table 6 according to the aggregation request.

TABLE 6

Post-KCS operations in algorithm VM2.

| VM2 Step | Operation |
|---|---|
| VM2-01 | determine V/K at each of the M DCs for the aggregation request |
| VM2-02 | determine working and protecting VMs at selected M DCs (e.g., using algorithm VM1) |
| VM2-03 | generate a VM-share table to determine a minimum number of protecting VMs for each of the M DCs |
| VM2-04 | update the number of working and protecting VMs for each of the M DCs according to the protecting VMs in the VM-share table |

Algorithm VM3—Inter-Request VM Integrated Sharing:

In inter-request VM sharing, proper selection of DCs may result in fewer or no additional protecting VMs for a given aggregation request when enough shareable VMs are present in the overlay framework. Thus, DCs with a lower total risk frequency and fewer additional protecting VMs may be preferentially selected for the aggregation request, since such DCs may be more likely to share VMs with already-allocated aggregation requests. In algorithm VM2, an integrated factor $I_j$ at $DC_j$ may be calculated as $I_j$=totalRiskFrequency$_j$*additionalProtectVM$_j$ if additionalProtectVM$_j$>0, else as $I_j$=totalRiskFrequency$_j$. The totalRiskFrequency$_j$ is the total frequency of risks that are associated with $DC_j$ and the connection $DC_j$-$DC_a$, where a frequency of a risk is the number of DCs and respective connections to $DC_a$ associated with the risk. The value of additionalProtectVM$_j$ is a number of VMs allocated at $DC_j$ for the aggregation request minus sharedVM$_j$ where $$sharedVM_j = \mathrm{Max}_{\forall s_i \in S}\left(\sum_{\forall r \in R} v_{ijr}\right) - \mathrm{Max}_{\forall s_i' \in S'}\left(\sum_{\forall r \in R} v_{ijr}\right),$$

where S' is a set of risks associated with DCs currently selected for the aggregation request. The value sharedVM$_j$ is a difference between the maximum number of protecting VMs allocated at $DC_j$ and a number of protecting VMs allocated at $DC_j$ for protecting failures on currently selected DCs for the aggregation request. In other words, sharedVM$_j$ is a number of shareable VMs that may be used for protecting currently selected DCs for the aggregation request. When multiple DCs are present with enough shareable VMs, that is additionalProtectVM$_j$>0, then a DC having a lowest value for totalRiskFrequency$_j$ may be selected. Algorithm VM3 may include the operations in Table 7 according to the aggregation request.

TABLE 7

KCS operations in algorithm VM3.

| VM3 Step | Operation |
|---|---|
| VM3-01 | determine V/K at each of the M DCs for the aggregation request |
| VM3-02 | compute a value for the integrated factor I$_j$ for each DC among the remaining unselected DCs |
| VM3-03 | sort the currently unselected DCs according to the integrated factor I$_j$ |
| VM3-04 | add the DC with the lowest value for I$_j$ to an output set of DCs satisfying KCS and return to step VM3-02 until KCS is satisfied. Otherwise, if M < N, then increment M, empty the output set of DCs satisfying KCS and return to step VM3-02 |
| VM3-05 | if KCS is satisfied, execute steps VM2-02, VM2-03, and VM2-04 from algorithm VM2, else end |

Figure 4A:
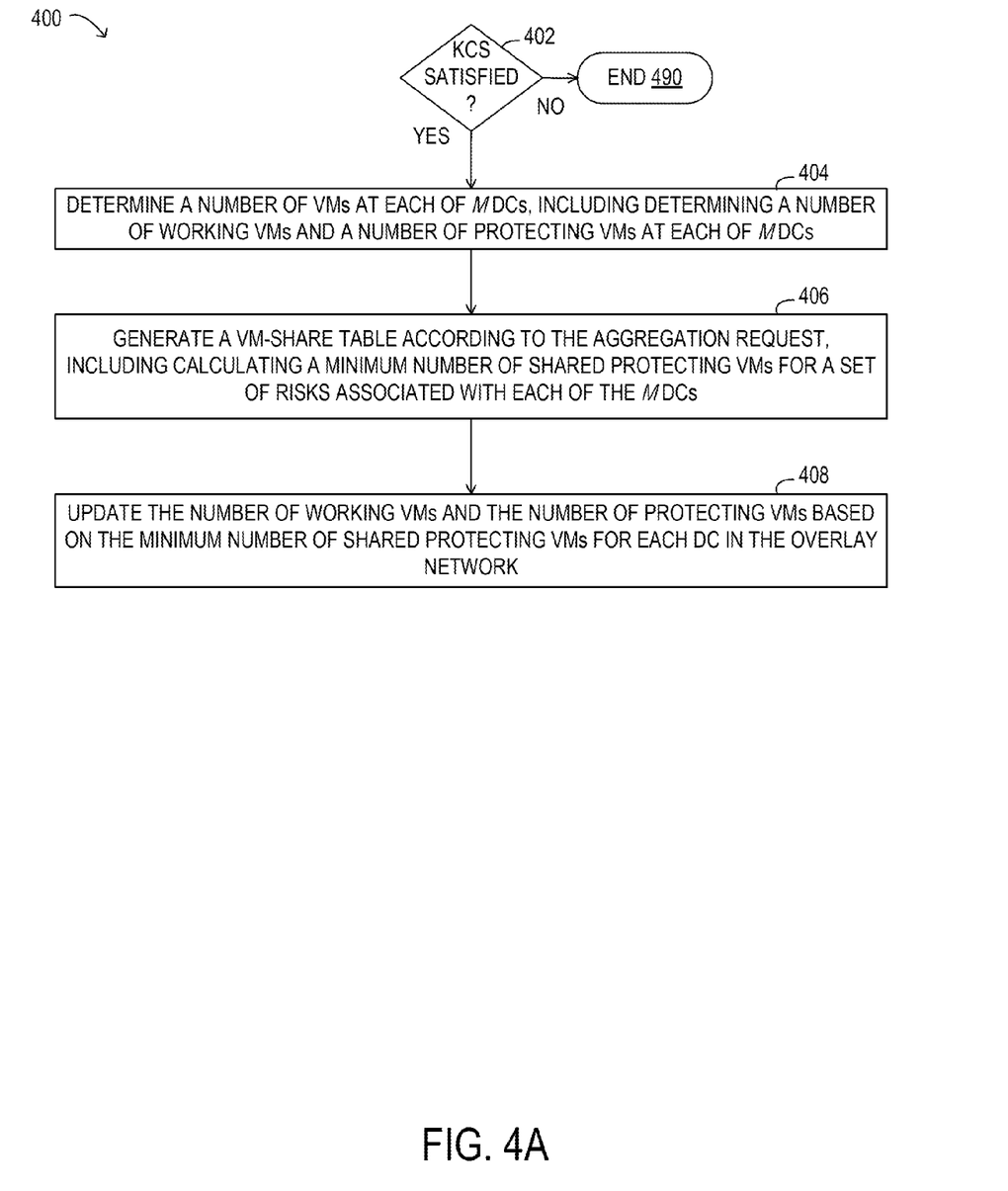
FIG. 4A is a flow chart depicting selected elements of an embodiment of a method for implementing K-connect survivability using VM sharing.

Referring now to FIG. 4A, selected elements of an embodiment of method 400 for implementing K-connect survivability using VM sharing, as described herein, is shown in flow chart format. In various embodiments, method 400 may be implemented using KCS identification 530 (see FIG. 5). It is noted that certain operations depicted in method 400 may be rearranged or omitted, as desired.

Method 400 may begin by determining whether KCS is satisfied (operation 402) for an aggregation request. When the result of operation 402 is NO, method 400 may end (operation 490). When the result of operation 402 is YES, a number of VMs at each of M DCs may be determined (operation 404), including determining a number of working VMs and a number of protecting VMs at each of the M DCs. A VM-share table may be generated (operation 406) according to the aggregation request, including calculating a minimum number of shared protecting VMs for a set of risks associated with each of the M DCs. The number of working VMs and the number of protecting VMs may be updated (operation 408) based on the minimum number of shared protecting VMs for each DC on the overlay network.

Figure 4B:
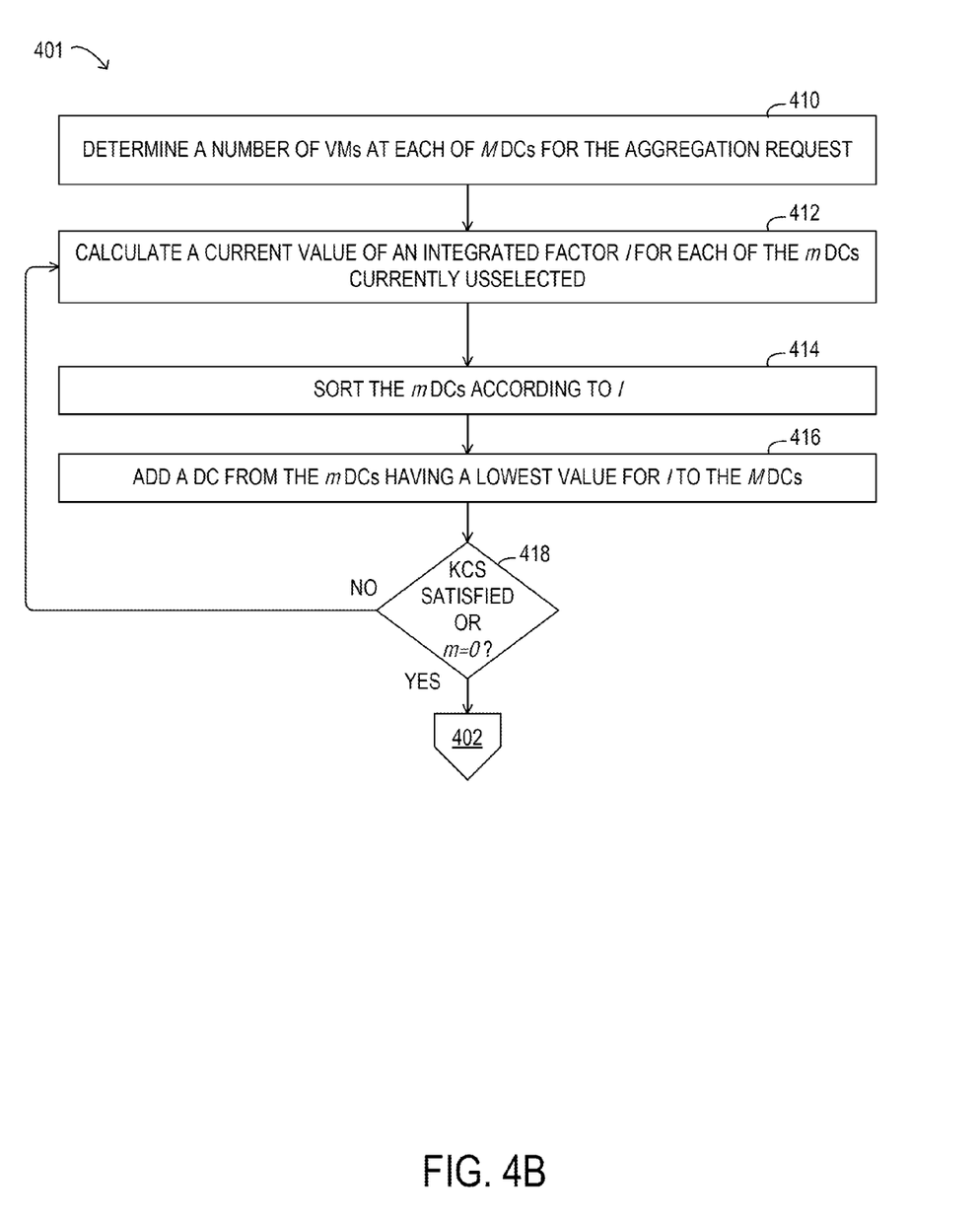
FIG. 4B is a flow chart depicting selected elements of an embodiment of a method for implementing K-connect survivability using VM sharing.

Referring now to FIG. 4B, selected elements of an embodiment of method 401 for implementing K-connect survivability using VM sharing, as described herein, is shown in flow chart format. Method 401 may represent at least a portion of operation 403 in method 400 (see FIG. 4A). In various embodiments, method 401 may be implemented using KCS identification 530 (see FIG. 5). It is noted that certain operations depicted in method 401 may be rearranged or omitted, as desired.

Method 401 may begin by determining (operation 410) a number of VMs at each of M DCs for the aggregation request. A current value of an integrated factor I may be calculated (operation 412) for each of the m DCs currently unselected. It is noted that when method 401 is repeated, m may initially have a value of zero (0). The integrated factor I may be calculated as I$_j$ described above with respect to algorithm VM3. The m DCs may be sorted (operation 414) according to I. A DC from the m DCs having a lowest value for I may be added (operation 416) to the M DCs. Then a decision may be made whether KCS is satisfied or whether m=0 (operation 418). When the result of operation 418 is NO, method 401 may loop back to operation 412. When the result of operation 418 is YES, method 401 may proceed to operation 402 in method 400 (see FIG. 4A).

Figure 5:
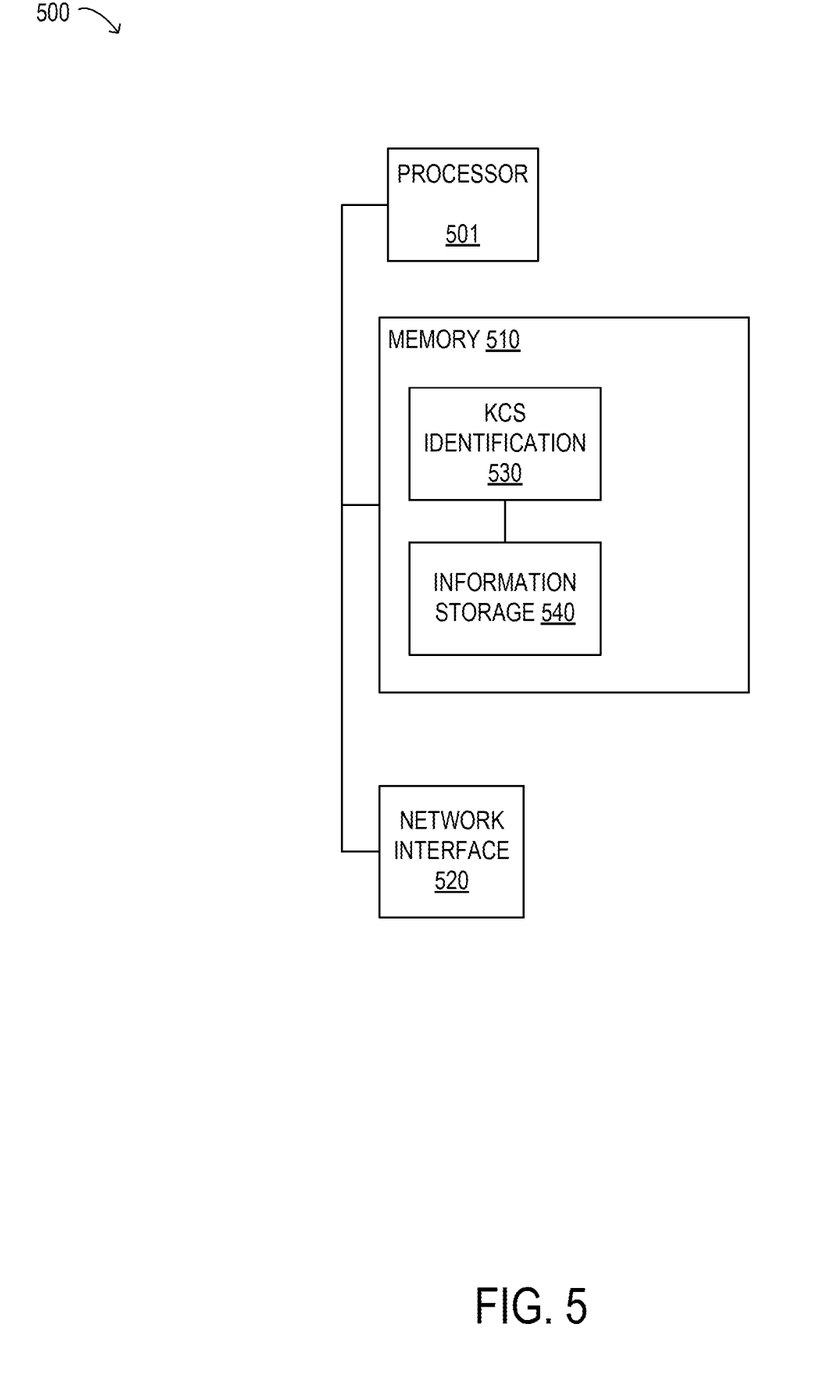
FIG. 5 is a block diagram of selected elements of an embodiment of a management system.

Referring now to FIG. 5, a block diagram of selected elements of an embodiment of management system 500 is illustrated. In FIG. 5, management system 500 is represented as a computer system including physical and logical components for implementing K-connect survivability using VM sharing, as described herein, and may accordingly include processor 501, memory 510, and network interface 520. Processor 501 may represent one or more individual processing units and may execute program instructions, interpret data, and/or process data stored by memory 510 and/or management system 500.

In FIG. 5, memory 510 may be communicatively coupled to processor 501 and may comprise a system, device, or apparatus suitable to retain program instructions and/or data for a period of time (e.g., computer-readable media). Memory 510 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory. Non-volatile memory refers to a memory that retains data after power is turned off. It is noted that memory 510 may include different numbers of physical storage devices, in various embodiments.

As shown in FIG. 5, memory 510 may include K-connect survivability (KCS) identification 530, which may represent respective sets of computer-readable instructions that, when executed by a processor, such as processor 501, may execute various algorithms for identifying DCs and/or SRGs to satisfy K-connect survivability, including, but not limited to, Risk-Based Algorithm A1, Delay-Based Algorithm A2 (see U.S. application Ser. No. 14/102,313), as well as Algorithm VM1—Intra-Request VM Sharing, Algorithm VM2—Inter-Request VM Risk-Based Sharing, and/or Algorithm VM3—Inter-Request VM Integrated Sharing. Information storage 540 may store various data and parameters, such as data and parameters associated with KCS identification 530.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method, comprising:
   identifying a smallest M number of data centers (DCs) in an overlay network for K-connect survivability associated with an aggregation request for an aggregation DC and a smallest V number of virtual machines (VMs) among the M DCs, including:
   when K-connect survivability is satisfied for the M number of DCs:
   determining a number of VMs at each of the M DCs, including determining a number of working VMs and a number of protecting VMs, respectively;
   generating a VM-share table according to the aggregation request, wherein a minimum number of shared protecting VMs is calculated for a set of risks associated with each of the M DCs; and
   updating the number of working VMs and the number of protecting VMs based on the minimum number of shared protecting VMs for each of the M DCs, wherein K represents a minimum number of DCs that remain accessible to the aggregation DC, and wherein the overlay network represents a physical network.

2. The method of claim 1, further comprising:

for each of a plurality of aggregation requests for the overlay network, identifying the smallest M number of DCs for K-connect survivability and the smallest V number of VMs among the M DCs.

3. The method of claim 1, wherein the number of VMs at each of the M DCs is given by V/K.

4. The method of claim 1, wherein determining that K-connect survivability is satisfied includes:

determining the number of VMs at each of the M DCs for the aggregation request;

calculating a current value of an integrated factor I for each of m DCs that are unselected;

sorting the m DCs according to I; and adding a DC from the m DCs having a lowest value for I to the M DCs.

5. The method of claim 4, wherein the current value of an integrated factor I is calculated as an integrated factor $I_j$ at $DC_j$, given by:

if additionalProtectVM$_j$>0, then $I_j$= (totalRiskFrequency$_j$*additionalProtectVM$_j$), else if additionalProtectVM$_j$≤0, then $I_j$=totalRiskFrequency$_j$, wherein totalRiskFrequency$_j$ is the total frequency of risks that are associated with $DC_j$ and the connection between $DC_j$ and the aggregation DC, wherein a frequency of a risk is a number of DCs and respective connections to $DC_a$ associated with the risk, wherein additionalProtectVM$_j$ is a number of VMs allocated at $DC_j$ for the aggregation request minus sharedVM$_j$, wherein $$sharedVM_j = \text{Max}_{\forall s_i \in S}\left(\sum_{\forall r \in R} v_{ijr}\right) - \text{Max}_{\forall s'_i \in S'}\left(\sum_{\forall r \in R} v_{ijr}\right),$$

wherein S' is a set of risks associated with DCs currently selected for the aggregation request, and wherein $V_{ijr}$ is a number of protecting VMs required at $DC_j$ when a risk $s_i$ in the set of risks S occurs for aggregation request r.

6. The method of claim 1, wherein the VM-share table is generated for each aggregation request r in a set of aggregation requests R, wherein the VM-share table includes value pairs $(s_i, v_{ijr})$, wherein $V_{ijr}$ is a number of protecting VMs required at $DC_j$ when a risk $s_i$ in the set of risks S occurs for aggregation request r, and wherein the minimum number of shared protecting VMs is calculated as $$\text{Max}_{\forall s_i \in S}\left(\sum_{\forall r \in R} v_{ijr}\right).$$

7. An article of manufacture, comprising:

a non-transitory, computer-readable medium; and computer executable instructions stored on the computer-readable medium, the instructions readable by a processor and, when executed, for causing the processor to:

identify a smallest M number of data centers (DCs) in an overlay network for K-connect survivability associated with an aggregation request for an aggregation DC and a smallest V number of virtual machines (VMs) among the M DCs, including:

when K-connect survivability is satisfied for the M number of DCs:

determine a number of VMs at each of the M DCs, including determining a number of working VMs and a number of protecting VMs, respectively;

generate a VM-share table according to the aggregation request, wherein a minimum number of shared protecting VMs is calculated for a set of risks associated with each of the MDCs; and update the number of working VMs and the number of protecting VMs based on the minimum number of shared protecting VMs for each of the MDCs, wherein K represents a minimum number of DCs that remain accessible to the aggregation DC, and wherein the overlay network represents a physical network.

8. The article of manufacture of claim 7, further comprising instructions to:

for each of a plurality of aggregation requests for the overlay network, identify the smallest M number of DCs for K-connect survivability and the smallest V number of VMs among the M DCs.

9. The article of manufacture of claim 7, wherein the number of VMs at each of the M DCs is given by V/K.

10. The article of manufacture of claim 7, wherein the instructions to determine that K-connect survivability is satisfied include instructions to:

determine the number of VMs at each of the MDCs for the aggregation request;

calculate a current value of an integrated factor I for each of m DCs that are unselected;

sort the m DCs according to I; and add a DC from the m DCs having a lowest value for I to the M DCs.

11. The article of manufacture of claim 10, wherein the current value of an integrated factor I is calculated as an integrated factor $I_j$ at $DC_j$, given by:

if additionalProtectVM$_j$>0, then $I_j$=totalRiskFrequency$_j$*additionalProtectVM$_j$, else if additionalProtectVM$_j$≤0, then $I_j$=totalRiskFrequency$_j$, wherein totalRiskFrequency$_j$ is the total frequency of risks that are associated with $DC_j$ and the connection between $DC_j$ and the aggregation DC, wherein a frequency of a risk is a number of DCs and respective connections to $DC_a$ associated with the risk, wherein additionalProtectVM$_j$ is a number of VMs allocated at $DC_j$ for the aggregation request minus sharedVM$_j$, wherein $$sharedVM_j = \text{Max}_{\forall s_i \in S}\left(\sum_{\forall r \in R} v_{ijr}\right) - \text{Max}_{\forall s'_i \in S'}\left(\sum_{\forall r \in R} v_{ijr}\right),$$

wherein S' is a set of risks associated with DCs currently selected for the aggregation request, and wherein $V_{ijr}$ is a number of protecting VMs required at $DC_j$ when a risk $s_i$ in the set of risks S occurs for aggregation request r.

12. The article of manufacture of claim 7, wherein the VM-share table is generated for each aggregation request r in a set of aggregation requests R, wherein the VM-share table includes value pairs $(s_i, v_{ijr})$, wherein $V_{ijr}$ is a number of protecting VMs required at $DC_j$ when a risk $s_i$ in the set of risks S occurs for aggregation request r, and wherein the minimum number of shared protecting VMs is calculated as $$\text{Max}_{\forall s_i \in S} \left( \sum_{\forall r \in R} v_{ijr} \right).$$

13. A management system, comprising:
a memory;
a processor coupled to the memory; and
processor-executable instructions stored on the memory, the instructions readable by the processor and, when executed, for causing the processor to:
  identify a smallest M number of data centers (DCs) in an overlay network for K-connect survivability associated with an aggregation request for an aggregation DC and a smallest V number of virtual machines (VMs) among the M DCs, including:
  when K-connect survivability is satisfied for the M number of DCs:
    determine a number of VMs at each of the M DCs, including determining a number of working VMs and a number of protecting VMs, respectively;
    generate a VM-share table according to the aggregation request, wherein a minimum number of shared protecting VMs is calculated for a set of risks associated with each of the MDCs; and
    update the number of working VMs and the number of protecting VMs based on the minimum number of shared protecting VMs for each of the MDCs, wherein K represents a minimum number of DCs that remain accessible to the aggregation DC, and wherein the overlay network represents a physical network.

14. The management system of claim 13, further comprising instructions to:
  for each of a plurality of aggregation requests for the overlay network, identify the smallest M number of DCs for K-connect survivability and the smallest V number of VMs among the M DCs.

15. The management system of claim 13, wherein the number of VMs at each of the M DCs is given by V/K.

16. The management system of claim 13, wherein the instructions to determine that K-connect survivability is satisfied include instructions to:
  determine the number of VMs at each of the MDCs for the aggregation request;
  calculate a current value of an integrated factor I for each of m DCs that are unselected;
  sort the m DCs according to I; and
  add a DC from the m DCs having a lowest value for I to the M DCs.

17. The management system of claim 16, wherein the current value of an integrated factor I is calculated as an integrated factor $I_j$ at $DC_j$, given by:
  if additionalProtectVM$_j$>0, then
    $I_j$=totalRiskFrequency$_j$*additionalProtectVM$_j$, else if additionalProtectVM$_j$≤0, then
    $I_j$=totalRiskFrequency$_j$, wherein totalRiskFrequency$_j$ is the total frequency of risks that are associated with $DC_j$ and the connection between $DC_j$ and the aggregation DC, wherein a frequency of a risk is a number of DCs and respective connections to $DC_a$ associated with the risk,
wherein additionalProtectVM$_j$ is a number of VMs allocated at $DC_j$ for the aggregation request minus sharedVM$_j$, wherein $$sharedVM_j = \text{Max}_{\forall s_i \in S}\left(\sum_{\forall r \in R} v_{ijr}\right) - \text{Max}_{\forall s_i' \in S'}\left(\sum_{\forall r \in R} v_{ijr}\right),$$

wherein S' is a set of risks associated with DCs currently selected for the aggregation request, and wherein $V_{ijr}$ is a number of protecting VMs required at $DC_j$ when a risk $s_i$ in the set of risks S occurs for aggregation request r.

18. The management system of claim 13, wherein the VM-share table is generated for each aggregation request r in a set of aggregation requests R, wherein the VM-share table includes value pairs ($s_i$, $v_{ijr}$), wherein $V_{ijr}$ is a number of protecting VMs required at $DC_j$ when a risk $s_i$ in the set of risks S occurs for aggregation request r, and wherein the minimum number of shared protecting VMs is calculated as $$\text{Max}_{\forall s_i \in S}\left(\sum_{\forall r \in R} v_{ijr}\right).$$

* * * * *